ical Patent [19] [11] Patent Number: 4,975,037
Freiheit [45] Date of Patent: Dec. 4, 1990

[54] WINDSHIELD REPAIR DEVICE

[76] Inventor: Robert Freiheit, 10331 Amada Pl., Santee, Calif. 92071

[21] Appl. No.: 393,234

[22] Filed: Sep. 15, 1989

[51] Int. Cl.$^5$ .............................................. B32B 35/00
[52] U.S. Cl. ...................................... 425/12; 156/94; 264/36; 425/13
[58] Field of Search .................................. 425/11–13; 264/36; 156/94

[56] References Cited

U.S. PATENT DOCUMENTS

| | | | |
|---|---|---|---|
| 3,562,366 | 2/1971 | Sohl | 264/23 |
| 3,765,975 | 10/1973 | Hollingsworth | 156/94 |
| 3,841,932 | 4/1973 | Forler et al. | 156/94 |
| 3,988,400 | 10/1976 | Luhman, III | 264/36 |
| 3,993,520 | 11/1976 | Werner et al. | 156/94 |
| 4,032,272 | 6/1977 | Miller | 425/12 |
| 4,280,861 | 7/1981 | Schwartz | 156/94 |
| 4,291,866 | 9/1981 | Petersen | 269/1 |
| 4,385,015 | 5/1983 | Klettke | 264/36 |
| 4,569,808 | 2/1986 | Smali | 264/36 |
| 4,681,520 | 7/1987 | Birkhauser, III | 425/12 |
| 4,775,305 | 10/1988 | Alexander et al. | 425/12 |
| 4,814,185 | 3/1989 | Jones | 425/12 |
| 4,820,148 | 4/1989 | Anderson | 425/12 |

Primary Examiner—James C. Housel
Attorney, Agent, or Firm—Calif K. Tervo

[57] ABSTRACT

A device for injecting a liquid repair material into a crack in glass such as a windshield has a central body portion including a rigid frame that is supported by three legs in a triangular configuration. A suction cup with a single adjustment knob holds the device against the windshield. One of the legs is an injector assembly comprising a cylinder and pressure screw assembly. Vacuum is applied to the cylinder by a nipple through the cylinder sidewall. An O-ring at the bottom of the cylinder sidewall seals between the bottom of the cylinder sidewall and the windshield. The pressure screw assembly includes a piston slidable within the internal passage. The lower end of the piston includes a seal for sealing engagement with the sidewall. In the preferred embodiment the piston seal is a sealing cap completely covering the bottom end of the piston and completely blocking the passage and sealing against said sidewall. External threads on the upper end of the cylinder sidewall engage internal threads on a grip cap attached to the upper end of the piston for retaining the piston seal at a position within the internal passage above the vacuum attachment during application of a vacuum (degasing) and for inserting the piston further into the internal passageway than the vacuum connection for pressurizing the passage.

4 Claims, 2 Drawing Sheets

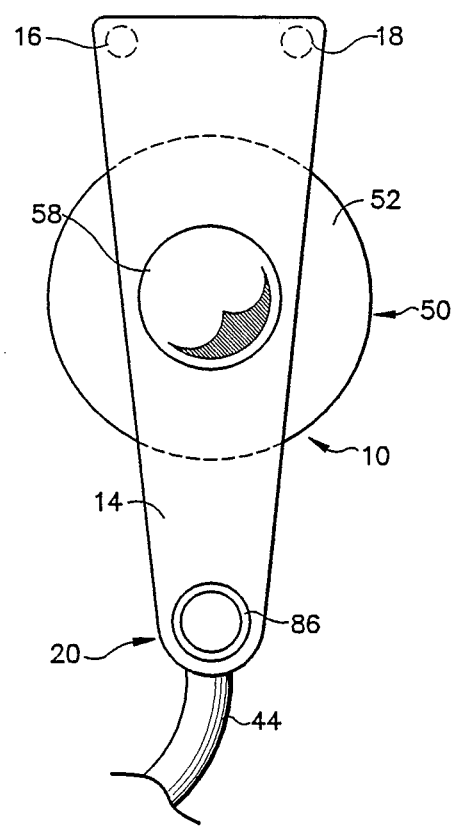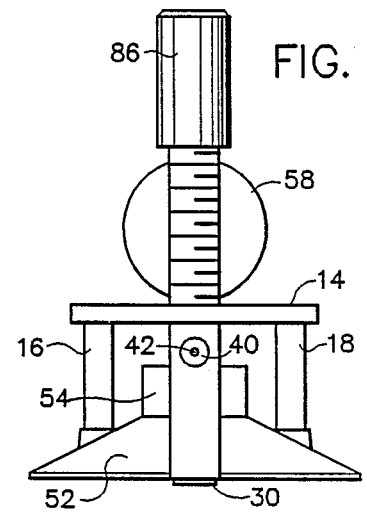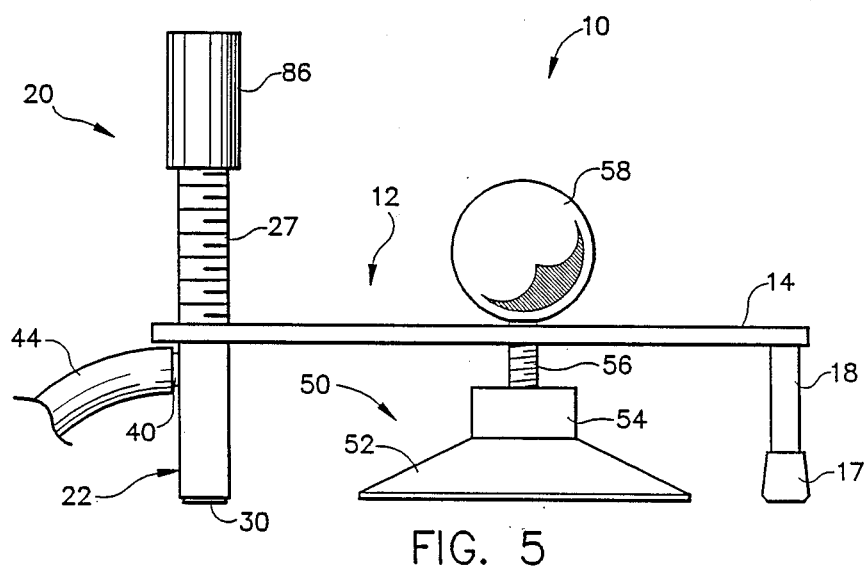

WINDSHIELD REPAIR DEVICE

BACKGROUND OF THE INVENTION

1. Field of the Invention

This invention relates to a device for repairing cracked glass and more particularly to a portable device for repairing cracked automobile windshields in place on the automobile.

2. Description of the Related Art

Devices and methods for using a chemical repair liquid for repairing automobile windshields in situ are well known in the art. In general, a repair liquid is introduced into the crack. Various degrees of pressure, and vacuum have been used to get the liquid into the crack and evacuate the air from the crack. U.S. Pat. No. 4,280,861 to Schwartz discloses a typical conventional repair device in which remote motor-driven pumps are used to supply both vacuum and pressure to inject repair liquid into a crack. U.S. Pat. No. 4,385,015 to Klettke discloses a similar device in which pressure is provided by a pressure screw and vacuum is provided by a remote pump.

There are a number of disadvantages in the prior art devices which use both pressure and vacuum which are overcome by the present invention.

There is a need for a small, simple device that is completely portable so that it can be used without motor driven vacuum pumps or pressure pumps.

It is desirable that the device attach easily and quickly to a windshield.

It is further desirable that such a device be easy to clean and be re-usable.

SUMMARY OF THE INVENTION

This invention is a device for injecting a liquid repair material into a crack in glass such as a windshield. The device has a central body portion including a rigid frame that is supported by three legs in a triangular configuration.

A suction cup assembly is connected to the frame and includes a suction cup attached under the frame within the triangle formed by the legs and a single adjustment knob attached to the suction cup for holding the frame against the windshield.

One of the legs is an injector assembly comprising a cylinder and pressure screw assembly. The cylinder has a central vertical internal passage therethrough surrounded by a sidewall. The sidewall includes a nipple providing a traverse passageway through the sidewall for attachment of a vacuum pump. An O-ring at the bottom of the cylinder sidewall seals between the bottom of the cylinder sidewall and the windshield.

The pressure screw assembly includes a sliding piston within the internal passage. The lower end of the piston includes a seal for sealing engagement with the sidewall. In the preferred embodiment the piston seal is a sealing cap completely covering the bottom end of the piston and completely blocking the passage and sealing against said sidewall.

External threads on the upper end of the cylinder sidewall engage internal threads on a grip cap attached to the upper end of the piston and provide a means for retaining the piston seal at a position within the internal passage above the vacuum attachment during application of a vacuum (degasing) and a means for inserting the piston further into the internal passageway than the vacuum connection for pressurizing the passage. Other features and many attendant advantages of the invention will become more apparent upon a reading of the following detailed description together with the drawings wherein like reference numerals refer to like parts throughout.

BRIEF DESCRIPTION OF THE DRAWINGS

FIG. 3 is a top plane view of the device.

FIG. 4 is an elevation view from the injector leg end of the device.

FIG. 5 is a side elevation view of the device.

DETAILED DESCRIPTION OF THE INVENTION

Figure 1:
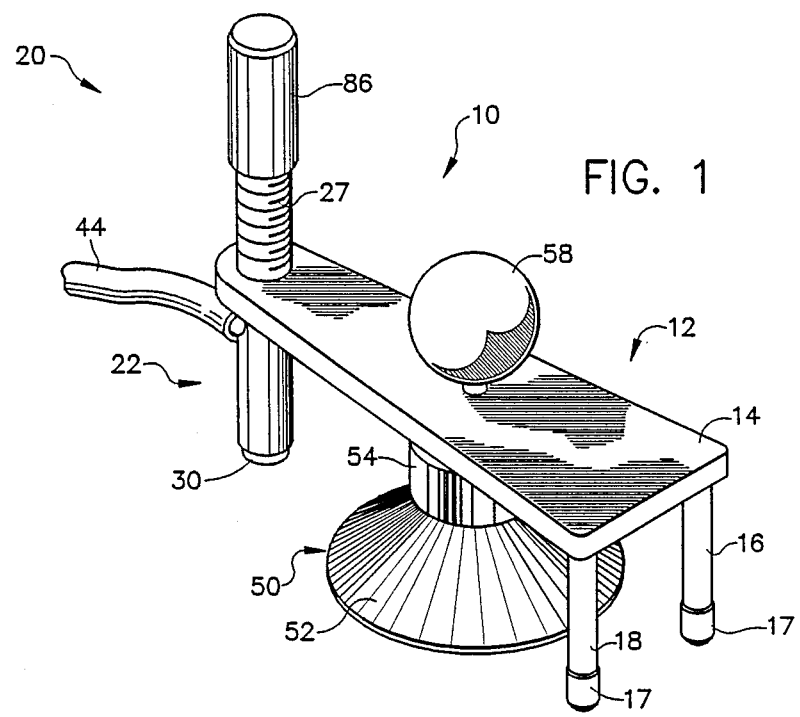
FIG. 1 is a perspective view of the windshield repair device of the present invention.

With reference now to the drawing, and more particularly to FIG. 1 thereof, the windshield repair device of the present invention is denoted generally as 10. The device 10 generally comprises a body, denoted generally as 12, and a suction means, such as a suction cup assembly, denoted generally as 50, for attaching body 12 to a windshield.

Body 12 includes a rigid frame 14 which is supported by three legs, two stabilizing legs 16,18 and an injector leg, denoted generally as 20. Legs 16,18,20 are attached to frame 14 in a triangular configuration such that body 12 is stable and will not rock when placed on an irregular surface such as the curved surface of a windshield. Body 12 may be constructed out of any suitably strong rigid material such as aluminum or strong plastic. In the prefered embodiment illustrated, frame 14 and support legs 16,18 have been made of aluminum and the injector leg has been made of plastic and stainless steel.

Suction cup assembly 50 is best seen in FIG. 5 and includes a large suction cup 52 that has a neck 54 in which a threaded tang 56 is mounted. Tang 56 passes freely through a hole in frame 14 to protrude above frame 14. An adjustment knob 58 is threadably mounted on tang 56 above frame 14. As best seen in FIG. 3, suction cup assembly 50 is mounted to frame 14 within the triangle formed by the three legs 16,18,20 such that, when suction cup 52 is attached to a windshield, screwing down a single knob 58 firmly presses the three legs 16,18,20 against the windshield and holds body 12 stably in position. Preferably, the bottom of stabilizing legs 16,18 each have a rubber tip 17 and, as will be seen, injector leg 20 includes a rubber sealing ring on its bottom. These rubber feet bear against the windshield, prevent scratching and marring, and tend to keep body 12 from movement once it contacts the windshield. In this manner, body 12 is resiliently loaded against the windshield. The suction cup assembly 50 itself is a rather conventional unit and such suction cups 52 are generally made of resilient material, such as rubber which will seal against a non-porus surface.

Figure 2:
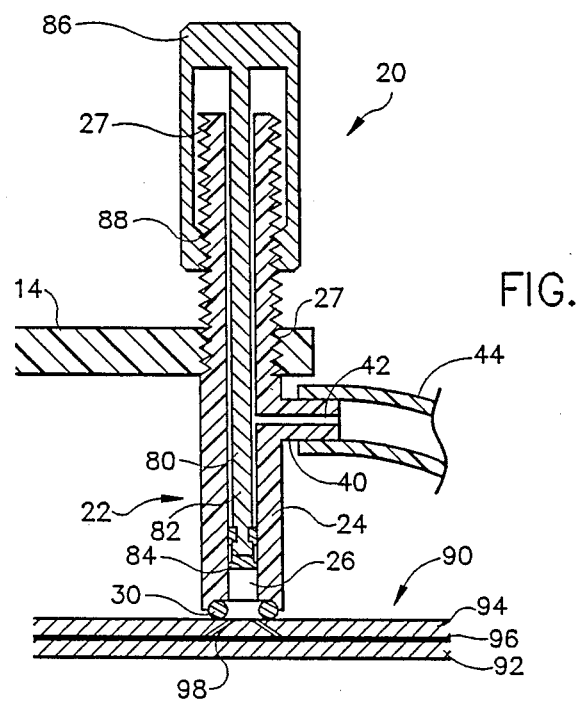
FIG. 2 is a cross-sectional view of the injector leg of the device of FIG. 1.

FIG. 2 illustrates a vertical cross-section of injector leg 20 as mounted on a cracked windshield, denoted generally as 90. Windshield 90 is a laminated glass such as an automobile windshield, comprising an outer glass lamination 94, an inner glass lamination 92, and an internal laminating film 96. A conical crack 98, "a bullseye", in outer glass 94 has separated a cone of glass having its base against the laminating film 96 and it apex at the face of outer glass 94.

Injector leg 20 is disposed over crack 98 and generally includes a cylinder, denoted generally as 22, and a pressure screw, denoted generally as 80.

Cylinder 22 includes sidewall 24 surrounding a vertical internal passage 26 that passes entirely through the cylinder 22. Cylinder 22 attaches to frame 14 by means such as external threads 27 on the upper end engaging an internally threaded hole in frame 14.

Nipple 40 is mounted in sidewall 24 and includes a transverse passageway 42 through sidewall 24. Vacuum hose 44 is attached to nipple 40.

A sealing ring, such as O-ring 30, is seated in a race on the bottom end of side wall 24 and seals between the sidewall and windshield 90.

Pressure screw 80, in general, includes a piston 82, sealing cap 84, and grip cap 86. Piston 82 is slidable within cylinder internal passage 26. Piston sealing means, such as sealing cap 84, completely covers the lower end of piston 82 and seals against sidewall 24. An annular groove in piston 82 receives a flanged portion of sealing cap 84 and retains the sealing cap 84 on the piston 82. One advantage of sealing cap 84 over a conventional O-ring is that sealing cap 84 need only seal against the sidewall while an O-ring needs to seal against both sidewall and piston.

A grip cap 86 is attached to the upper end of piston 82 and includes internal threads 88 that engage external threads 27 on cylinder 22 for adjusting the height of sealing cap 84 within passage 26. Pressure screw 80 can be completely unscrewed and detached from cylinder 22.

In operation, device 10, with knob 58 screwed toward the top of tang 56 and with pressure screw 80 removed, is placed on the windshield so that sealing ring 30 of injector leg 20 surrounds the apex of crack 98. Preferably, device 10 is rotated about injector leg 20 and stabilizer legs 16,18 are placed on the windshield so that injector leg 20 is the most perpendicular to the windshield as possible. This will produce the best possible sealing for sealing ring 30. The apex of crack 98 can be viewed through internal passage 26 to assure accurate alignment.

At this point, knob 58 is used to push suction cup 52 against the glass for retention. Knob 58 is released and screwed down until legs 16,18,20 are firmly held against the glass. Thus, with a simple push and a screw, device 10 is held in place. As can be seen, legs 16,18,20 must support frame 14 sufficiently above the glass to accommodate any curvature of the glass, and, in the configuration of the prefered embodiment illustrated, sufficiently high to provide space for the suction cup under the frame. Applicant has found most windshields to be nearly simple curved surfaces such that the device can be attached with injector leg sufficiently perpendicular to achieve a good seal.

A repair fluid is introduced into the bottom of internal passage 26, preferably by means of a syringe or dropper bottle. The repair fluid can be any one of a variety of well-known liquid pre-polimers, such as "Kleer-Vu Resin" available from Kleer-vu Manufacturing Company of Santee, Calif., which is cured by exposure to ultraviolet light.

Piston 82 is inserted into passage 26, and, by means of interaction of grip cap 86 and the top of cylinder 22, the sealing cap 84 is retained above transverse passageway 42. This may be done by engaging external threads 27 with internal threads 88. With sealing cap 84 above passageway 42, a vacuum is applied to by means of a pump attached to vacuum hose 44. The pump may be of any suitable type, but a hand pump is sufficient and makes the device 10 of the invention completely portable and not dependent upon powered vacuum pumps and pressure device. A vacuum is maintained for a period of time sufficient to pull the air from the crack thru the repair liquid. Typically, holding a vacuum of twenty seven inches for two to three minutes is sufficient, but this can vary depending upon crack size and the viscosity of the repair fluid.

The vacuum is released and the pressure screw turned down by means of grip cap 86 to force repair liquid into the crack. Typical pressures obtained are eighty to one hundred pounds per square inch which is held for two to three minutes.

The pressure screw is than backed off and vacuum applied once more. This cycle is repeated until the crack is full of repair liquid and the entrapped air has been substantially completely drawn out of the crack. Typically, degasing is sufficiently completed after three such cycles.

The repair device is removed and final finishing is performed by conventional methods.

From the foregoing description, it is seen that the present invention provides an extremely simple, quick, efficient, and reliable manner of repairing a windshield.

Notably, there is no need to remove the piston once it is inserted into the internal passage. Thus, the repair liquid is not subjected to additional light as in some repair devices. This characteristic also reduces introduction of dirt and other contamination to the repair fluid.

Also, the smooth walled internal passage is easily cleaned after use for reuse, unlike conventional devices which have threaded internal passages.

Although a particular embodiment of the invention has been illustrated and described, various changes may be made in the form, construction and arrangement of the parts herein without sacrificing any of its advantages. Therefore, it is to be understood that all matter herein is to be interpreted as illustrative and not in any limiting sense, and it is intended to cover in the appended claims such modifications and changes as come within the true spirit and scope of the invention.

I claim:

1. A glass repair device for injecting a liquid repair material into a crack in glass comprising:
   a body comprising:
   a rigid frame; and
   three legs in a tripod configuration connected to said frame for supporting said frame away from the glass; and
   suction means connected to said body for attachment to the glass for holding said legs firmly against the glass; wherein one of said legs is an injector assembly comprising:
   a cylinder having a vertical internal passage therethrough surrounded by a sidewall; said sidewall having transverse passageway means therethrough for providing fluid communication between said internal passage and the exterior of said cylinder for attachment of a vacuum device;
   sealing ring means at the bottom of said cylinder sidewall for sealing between the bottom of said cylinder sidewall and the glass;
   piston means including: a piston slidable within said internal passage; and piston sealing means attached to said piston for sealing engagement with said sidewall;

means for selectively positioning said piston within said internal passage, said positioning means;

retaining said piston sealing means at a position within said internal passage above said transverse passageway means during application of a vacuum to said transverse passageway, and inserting said piston sealing means further into said internal passageway than said transverse passageway means for pressurizing the volume between said transverse passageway and the glass; said positioning means including:

external threads on said cylinder sidewall; and a grip cap attached to the upper end of said piston means; said grip cap having an internal thread for engagement with said sidewall external threads.

2. The windshield repair device of claim 1 wherein:
said piston sealing means is a sealing cap completely covering the bottom end of said piston and completely blocking said passage and sealing against said sidewall.

3. The windshield repair device of claim 1 further including:
vacuum means for providing a vacuum to said transverse passageway.

4. The windshield repair device of claim 1 wherein said suction means includes a suction cup attached to said frame within the triangle formed by said legs and a single adjustment means attached to said suction cup for holding said frame such that said legs are pressed against the glass and for adjusting the pressure of said legs on the glass.

* * * * *